United States Patent
Szita et al.

(10) Patent No.: US 8,416,648 B2
(45) Date of Patent: Apr. 9, 2013

(54) SYSTEM AND METHOD FOR FORMING A SERVO PATTERN ON A MEDIA MASTER

(75) Inventors: Gabor Szita, Newark, CA (US); Koichi Wago, Sunnyvale, CA (US); Neil Deeman, Alamo, CA (US)

(73) Assignee: Seagate Technology LLC, Cupertino, CA (US)

( * ) Notice: Subject to any disclaimer, the term of this patent is extended or adjusted under 35 U.S.C. 154(b) by 51 days.

(21) Appl. No.: 12/873,254

(22) Filed: Aug. 31, 2010

(65) Prior Publication Data

US 2012/0049407 A1   Mar. 1, 2012

(51) Int. Cl.
G11B 11/00     (2006.01)
G11B 5/596     (2006.01)

(52) U.S. Cl.
USPC .......... 369/13.02; 369/13.56; 360/77.08; 360/48

(58) Field of Classification Search ......... 360/48, 360/75, 49, 55, 17, 77.08; 264/220; 118/696; 369/13.56, 13.02
See application file for complete search history.

(56) References Cited

U.S. PATENT DOCUMENTS

| | | | |
|---|---|---|---|
| 5,170,299 | A | 12/1992 | Moon |
| 5,255,136 | A | 10/1993 | Machado |
| 5,315,456 | A | 5/1994 | Hessing |
| 5,991,104 | A | 11/1999 | Bonyhard |
| 6,181,492 | B1 | 1/2001 | Bonyhard |
| 6,212,023 | B1 | 4/2001 | Bonyhard |
| 6,262,859 | B1 * | 7/2001 | Cho ........................ 360/77.08 |
| 6,643,082 | B1 * | 11/2003 | Belser ........................ 360/48 |
| 6,954,323 | B2 | 10/2005 | Deeman |
| 7,009,391 | B2 * | 3/2006 | Lee et al. ..................... 324/212 |
| 7,028,743 | B1 | 4/2006 | Wang |
| 7,036,209 | B1 | 5/2006 | Wago |
| 7,054,092 | B2 * | 5/2006 | Ehrlich ........................ 360/75 |
| 7,092,183 | B2 * | 8/2006 | Ehrlich ........................ 360/48 |
| 7,095,580 | B2 * | 8/2006 | Ehrlich et al. ............. 360/77.08 |
| 7,167,329 | B2 * | 1/2007 | Baker ........................ 360/55 |
| 7,206,148 | B2 * | 4/2007 | Ehrlich ........................ 360/49 |
| 7,459,241 | B2 | 12/2008 | Wago |
| 7,642,041 | B2 | 1/2010 | Wago |
| 7,746,594 | B1 | 6/2010 | Guo |
| 7,746,595 | B1 | 6/2010 | Guo |
| 2005/0064297 | A1 | 3/2005 | Wago |
| 2007/0206453 | A1 | 9/2007 | Kuo et al. |
| 2008/0113157 | A1 | 5/2008 | Lee |
| 2010/0276390 | A1 | 11/2010 | Chauhan et al. |

* cited by examiner

*Primary Examiner* — Ali Neyzari
(74) *Attorney, Agent, or Firm* — Hollingsworth David, LLC

(57) ABSTRACT

Producing a servo pattern on a media involves rotating a master, and during a first revolution of the master, forming a first transition at a first radial position on the master, and forming a first transition at a second radial position. During a second revolution of the master, a second transition at the first radial position is formed, and a second transition at the second radial position is formed. By exposing individual servo burst transitions located at the first and second radial positions, in separate disk revolutions, only one of the magnetic transitions will inherit a particular deflection from a nominal radial position. If there are any mechanical disturbances, each magnetic transition will be randomly displaced from its nominal position, reducing the written-in run-out by $\sqrt{n}$, where n is the number of magnetic transitions in a particular servo burst.

14 Claims, 2 Drawing Sheets

SYSTEM AND METHOD FOR FORMING A SERVO PATTERN ON A MEDIA MASTER

SUMMARY

Embodiments of the disclosure are generally directed to apparatuses and methods for forming a servo pattern on a master disk. Various embodiments involve rotating a master and, during a first revolution of the master, forming a first transition at a first nominal radial position on the master, and a first transition at a second nominal radial position on the master. During a second revolution of the master, a second transition is formed at the first nominal radial position on the master, and a second transition if formed at the second nominal radial position on the mater. Transitions are typically formed on the master by exposing the master to a recording beam. Various embodiments involve forming a stamper from the exposed master and forming servo patterns on media using the stamper.

Other embodiments involve rotating a master and exposing a servo pattern on the master during rotation of the master, wherein the servo pattern comprises a plurality of servo bursts at different radial positions on the master. Each servo burst comprises a plurality of transitions, wherein the plurality of transitions in each servo burst are individually exposed in separate revolutions of the master. In some embodiments, displacements of individual ones of the plurality of transitions of a servo burst from a nominal radial position are randomized. For example, each transition may comprise a plurality of spots at different respective radial positions within the transition, and spots of adjacent transitions within a burst may be exposed at the different respective radial positions within the transition during the same revolution of the master. Each transition may comprises a plurality of spots at different respective radial positions within the transition, and spots of adjacent transitions at a same nominal radial position within a burst may be exposed in separate revolutions of the master.

In some embodiments, exposing a servo pattern may involve rotating the master a first revolution and forming a first transition of a first one of the servo bursts at a first radial position during the first revolution and forming a first transition of a second one of the servo bursts at a second radial position during the first revolution. Exposing a servo pattern may involve rotating the master a second revolution and forming a second transition of the first one of the servo bursts at the first radial position during the second revolution and forming a second transition of the second one of the servo bursts at the second radial position during the second revolution.

In accordance with various embodiments, an arrangement for creating a servo pattern on a media includes a master disk writer and a controller coupled to the master disk writer. The controller is configured to control the master disk writer to expose a servo pattern on a master disk during rotation of the master disk. The servo pattern preferably comprises a plurality of servo bursts at different radial positions on the master disk, each servo burst comprising a plurality of transitions, wherein the plurality of transitions in each servo burst are individually exposed in separate revolutions of the master disk.

The controller may be configured to control the master disk writer to expose a servo pattern by rotating the master disk a first revolution and forming a first transition of a first one of the servo bursts at a first radial position during the first revolution and forming a first transition of a second one of the servo bursts at a second radial position during the first revolution. For example, the controller may be configured to control the master disk writer to expose a servo pattern by rotating the master disk a second revolution and forming a second transition of the first one of the servo bursts at the first radial position during the second revolution and forming a second transition of the second one of the servo bursts at the second radial position during the second revolution.

Each transition may comprise a plurality of spots at different respective radial positions within the transition, and the controller may be configured to control the master disk writer to expose spots of adjacent transitions within a burst at the different respective radial positions within the transition during the same revolution of the master. Each transition may comprise a plurality of spots at different respective radial positions within the transition, and the controller may be configured to control the master disk writer to expose spots of adjacent transitions at a same nominal radial position within a burst in separate revolutions of the master. The controller may be configured to control the master disk writer to cause an exposing beam to move in a generally diagonal direction when exposing servo bursts at different radial positions on the master disk.

These and other features and aspects which characterize various embodiments of the disclosure can be understood in view of the following detailed discussion and the accompanying drawings.

DETAILED DESCRIPTION

Figure 1:
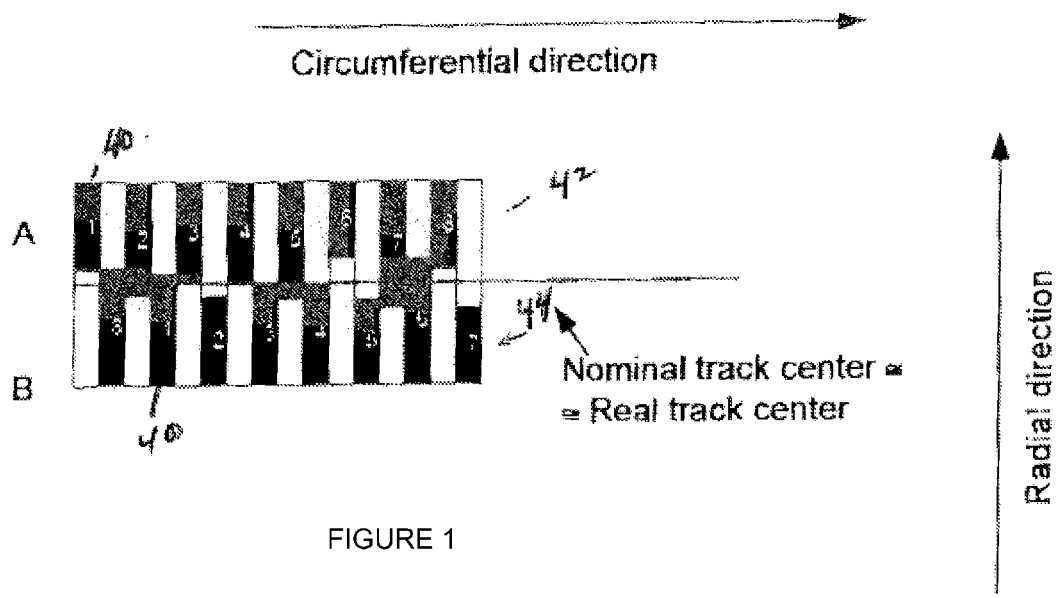
FIG. 1 depicts an exposition scheme for writing a null pattern in accordance with various embodiments.

Various embodiments are directed to forming a servo pattern on a media, including embodiments that provide for a reduction of written-in run-out. In hard disk drives, a head positioning servo system requires accurate measurement of the location of the recording head relative to the disk surface. This is usually accomplished by writing special servo marks on the surface of the disks during production. Typically, these servo marks are written using a high accuracy servo track writing machine. As track density of hard disk drives increases, so does the accuracy requirement of the servo track writing machine.

According to one approach, an unexposed master disk is positioned on a rotating table. A laser beam or electron beam may be deflected in the radial direction relative to the disk surface and/or the rotating table may be radially moved relative to the beam. Using one or both of these radial positioning configurations, the master disk surface is circularly scanned by the beam, and the desired servo pattern is exposed by turning the beam on and off at appropriate locations. The accuracy of the mastering equipment is important, because any errors in the master generating process will be inherited by the replicated disks. Any mechanical instability, resonance and other disturbances, for example, will result in inaccuracies.

Servo sectors are used to determine the position of the head relative to the track center. In the radial direction, the servo sectors can be arranged so as to form servo wedges. For example, a few hundred servo wedges may be formed on each disk surface. Each servo sector may include a Gray code field to provide coarse position information (track number), and a servo burst field to provide fine position information. Each servo burst may include one or more transitions that generate signals in a read transducer (head) of the drive, and can be arranged to form a quadrature or null servo pattern.

The track center of a disk drive is typically defined by the transition of two adjacent servo bursts. Ideally, the transition points between bursts lay on a perfect circle. However, if there is any inaccuracy in positioning the exposing beam, then the burst transitions deviate from their nominal locations, and the transitions no longer form a perfect circle. The non-circularity is usually referred to as written-in run-out. When disks are built into a disk drive, this written-in run-out causes undesirable repeatable run-out (RRO). The written-in run-out during the mastering process is typically caused by various mechanical disturbances and resonance. The frequency range of this disturbance is usually below a few hundred Hertz. This frequency range is significantly higher than the frequency of master disk revolutions, but it is significantly lower than the frequency by which the servo sectors follow each other.

Several embodiments will be described with respect to a null servo pattern. However, it should be apparent to those skilled in the art that the disclosed apparatuses and methods are applicable to other types of servo patterns, such as quadrature pattern, phase pattern, etc. Furthermore, the embodiments described herein may be employed with various types of mastering equipment, such as a laser beam apparatus, an electron beam apparatus, etc.

FIG. 1 depicts an exposition scheme in accordance with various embodiments. Importantly, the transitions 40 within the A burst 42 and the B burst 44, respectively, are not written in the same revolutions. The rectangles representing the transitions 40 in FIG. 1 are generated by exposing a photosensitive layer of the master disk by laser or electron beam. The numbers in the rectangles represent master disk revolutions, i.e., passes of the laser beam during the master generation process. The exposed and unexposed areas ultimately become magnetic transitions on the surface of magnetic disks during the replication process.

Embodiments according to FIG. 1 provide for causing exposure of a transition in the first burst 42 during a first revolution, and a transition in the second burst 44 during the same first revolution. In other words, during the first revolution, a first transition 40 is formed at a first nominal radial position (burst 42) and a first transition 40 is formed at a second nominal radial position (burst 44). The revolutions of the master disk and exposure continues, as can be appreciated, with exposures at the first and second nominal radial positions occurring during each revolution.

By exposing the individual servo burst transitions located at the first and second nominal radial positions, in separate disk revolutions, only one of the magnetic transitions 40 will inherit a particular deflection from the nominal radial position. Assuming the mechanical disturbances are not correlated to disk revolutions, then the deflection at each sector can be considered to be a random variable. Therefore, each magnetic transition 40 will be randomly displaced from its nominal position. Since the track center at a particular servo sector is determined by the average of the magnetic transitions 40, the written-in run-out is reduced by $\sqrt{n}$, where n is the number of magnetic transitions 40 in a particular servo burst.

In the embodiment of FIG. 1, any errors caused by mechanical disturbances will be averaged out, rather than maintained throughout the transitions of a burst. The nominal track center and the real track center are therefore the same in the null pattern of FIG. 1, created in accordance with embodiments of the disclosure.

Figure 2:
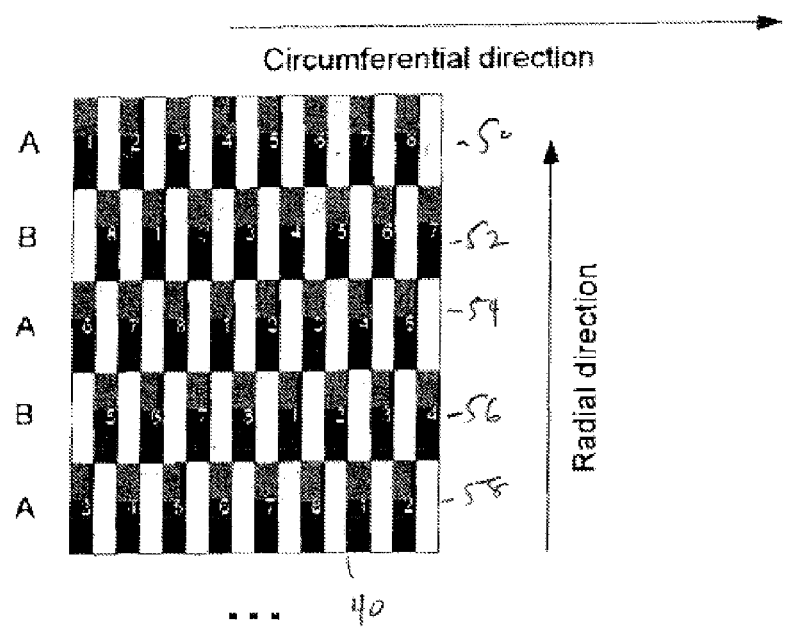
FIG. 2 depicts an exposition scheme in accordance with various embodiments, with multiple tracks.

Embodiments directed to forming a servo pattern on a media as described hereinabove are extensible, as demonstrated in FIG. 2. FIG. 2 shows an exposition scheme applied to a greater number of tracks 50-58. In this embodiment, the transitions 40 are exposed on a larger number of tracks during each revolution of the master disk. This has the advantage of reducing the number of extra revolutions required to write the pattern.

Figures 3, 4:
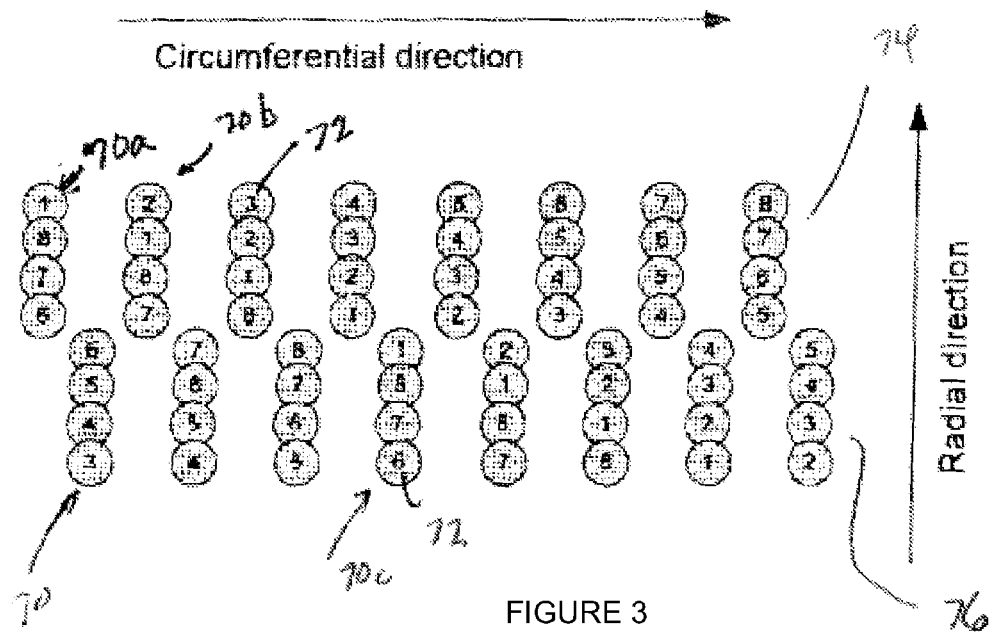
FIG. 3 depicts an exposition scheme in accordance with various embodiments for mastering equipment with spot exposition areas.
FIG. 4 is a block diagram of a mastering arrangement in accordance with various embodiments.

FIG. 3 shows an exposition scheme in accordance with various embodiments for use with mastering equipment that exposes using spots. As can be appreciated from the numbers within the circles representing the exposure spots 72, the spots of adjacent transitions 70 (for example, transitions 70a and 70b within burst 74) are formed at different respective radial positions during the same revolution of the master disk. For example, during the first revolution of the master disk, a spot is exposed at the uppermost nominal radial position in transition 70a. During this same revolution, a spot is exposed at the second-uppermost nominal radial position in transition 70b. Exposing spots in this manner is achieved by moving the laser or electron beam in a generally slanted or diagonal direction, starting from either the innermost or outermost spot of a burst transition for a given burst or series of radially-spaced bursts. This continues, with a spot being exposed in the uppermost nominal radial position of transition 70c in the burst 76 during the first revolution of the master disk, and so on. Hence, various embodiments involve exposing spots of adjacent transitions at a same nominal radial position within a burst in separate revolutions of the master, rather than the same revolution.

FIG. 4 depicts a block diagram of mastering equipment configured to form a master disk in accordance with various embodiments. A controller 80 is configured to control a master disk writer 82 to write a master disk 84 in accordance with the exemplary exposition schemes shown and described above. The controller 80 incorporates or is coupled to a processor 81 which can be configured to execute program instructions in accordance with executable control software 83 stored in memory 85. The controller 80 controls the mastering equipment, which may be any of a number of different types, such as electron beam, or laser beam writers, to form the exposures in accordance with the embodiments described above.

Various embodiments have been described hereinabove with examples of the ordering of exposition of transitions or spots of transitions during revolutions. It should be apparent that the specific ordering depicted in the figures is exemplary only, as other orderings of exposure, numbers of revolutions, etc. may be employed.

It is to be understood that even though numerous characteristics and aspects of various embodiments have been set forth in the foregoing description, together with details of the structure and function of various embodiments, this detailed description is illustrative only, and changes may be made in detail, especially in matters of structure and arrangements of parts to the full extent indicated by the broad general meaning of the terms in which the appended claims are expressed.

What is claimed is:

1. A method of forming a servo patterned master, comprising:

rotating a master; and exposing a servo pattern on the master during rotation of the master, the servo pattern having a plurality of servo bursts at different radial positions on the master, each servo burst comprising a plurality of transitions, wherein at least one transition of at least one servo burst at a first radial position is exposed in the same revolution of the master in which at least one transition of at least one servo burst at a second radial position is exposed.

2. The method of claim 1, wherein displacements of individual ones of the plurality of transitions of a servo burst from a nominal radial position are randomized.

3. The method of claim 2, wherein each transition comprises a plurality of spots at different respective radial positions within the transition, the method further comprising exposing spots of adjacent transitions within a burst at the different respective radial positions within the transition during the same revolution of the master.

4. The method of claim 2, wherein each transition comprises a plurality of spots at different respective radial positions within the transition, the method further comprising exposing spots of adjacent transitions at a same nominal radial position within a burst in separate revolutions of the master.

5. The method of claim 1, wherein exposing a servo pattern comprises rotating the master a first revolution and forming a first transition of a first one of the servo bursts at a first radial position during the first revolution and forming a first transition of a second one of the servo bursts at a second radial position during the first revolution.

6. The method of claim 5, wherein exposing a servo pattern comprises rotating the master a second revolution and forming a second transition of the first one of the servo bursts at the first radial position during the second revolution and forming a second transition of the second one of the servo bursts at the second radial position during the second revolution.

7. The method of claim 6, further comprising during an nth revolution of the master, forming an nth transition at the first radial position and an nth transition at the second radial position, where n is an integer greater than 2.

8. The method of claim 7, further comprising forming the 1 to n transitions at k respective radial positions during the 1 to n revolutions, where k is greater than 2.

9. An arrangement for creating a servo pattern on a media, comprising:
   a master disk writer; and
   a controller coupled to the master disk writer, the controller configured to control the master disk writer to expose a servo pattern on a master disk during rotation of the master disk, the servo pattern having a plurality of servo bursts at different radial positions on the master disk, each servo burst comprising a plurality of transitions, wherein the controller is configured to cause at least one transition of at least one servo burst at a first radial position to be exposed in the same revolution of the master in which at least one transition of at least one servo burst at a second radial position is exposed.

10. The arrangement of claim 9, wherein the controller is configured to control the master disk writer to expose a servo pattern by rotating the master disk a first revolution and forming a first transition of a first one of the servo bursts at a first radial position during the first revolution and forming a first transition of a second one of the servo bursts at a second radial position during the first revolution.

11. The arrangement of claim 10, wherein the controller is configured to control the master disk writer to expose a servo pattern by rotating the master disk a second revolution and forming a second transition of the first one of the servo bursts at the first radial position during the second revolution and forming a second transition of the second one of the servo bursts at the second radial position during the second revolution.

12. The arrangement of claim 9, wherein each transition comprises a plurality of spots at different respective radial positions within the transition, wherein the controller is configured to control the master disk writer to expose spots of adjacent transitions within a burst at the different respective radial positions within the transition during the same revolution of the master.

13. The arrangement of claim 9, wherein each transition comprises a plurality of spots at different respective radial positions within the transition, wherein the controller is configured to control the master disk writer to expose spots of adjacent transitions at a same nominal radial position within a burst in separate revolutions of the master.

14. The arrangement of claim 9, wherein the controller is configured to control the master disk writer to cause an exposing beam to move in a generally diagonal direction when exposing servo bursts at different radial positions on the master disk.

* * * * *